M. LECHNER.
ELECTRIC STORAGE BATTERY.
APPLICATION FILED JULY 29, 1918.
1,359,259.
Patented Nov. 16, 1920.
2 SHEETS—SHEET 2.
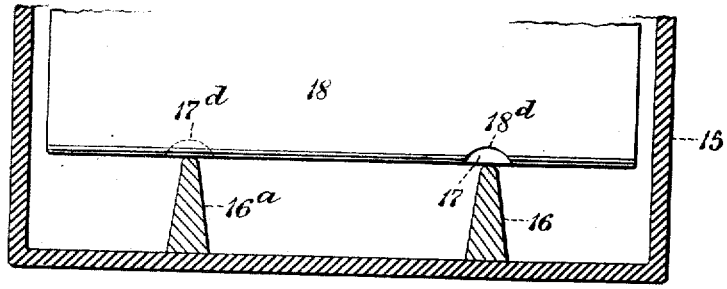
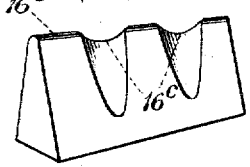 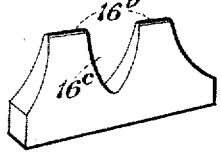 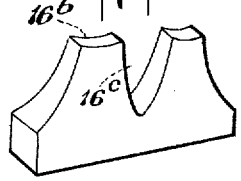
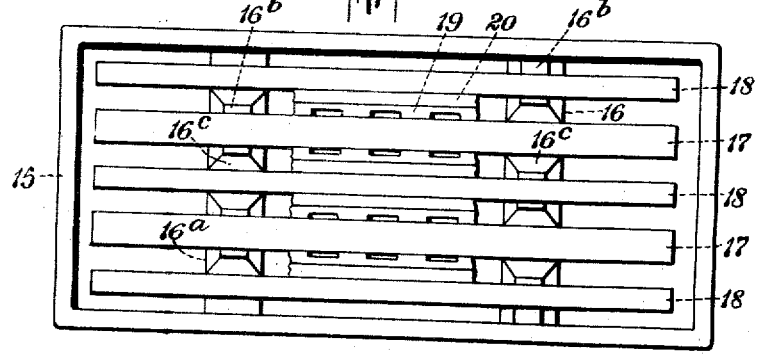
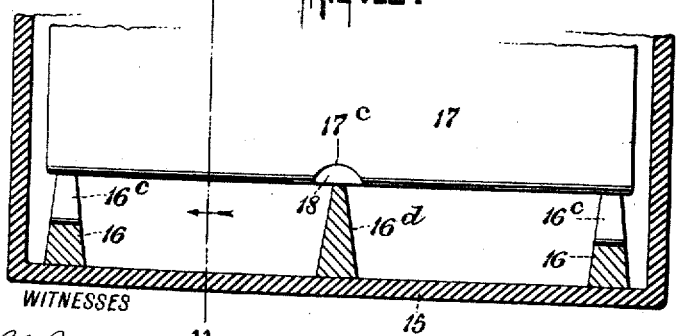 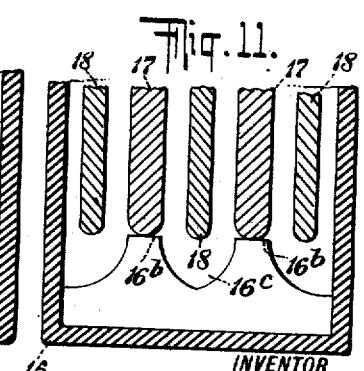
WITNESSES
G. V. Rasmussen
Thur A. Schlenker
INVENTOR
Matthew Lechner
BY
Wilson & Schenck
ATTORNEYS

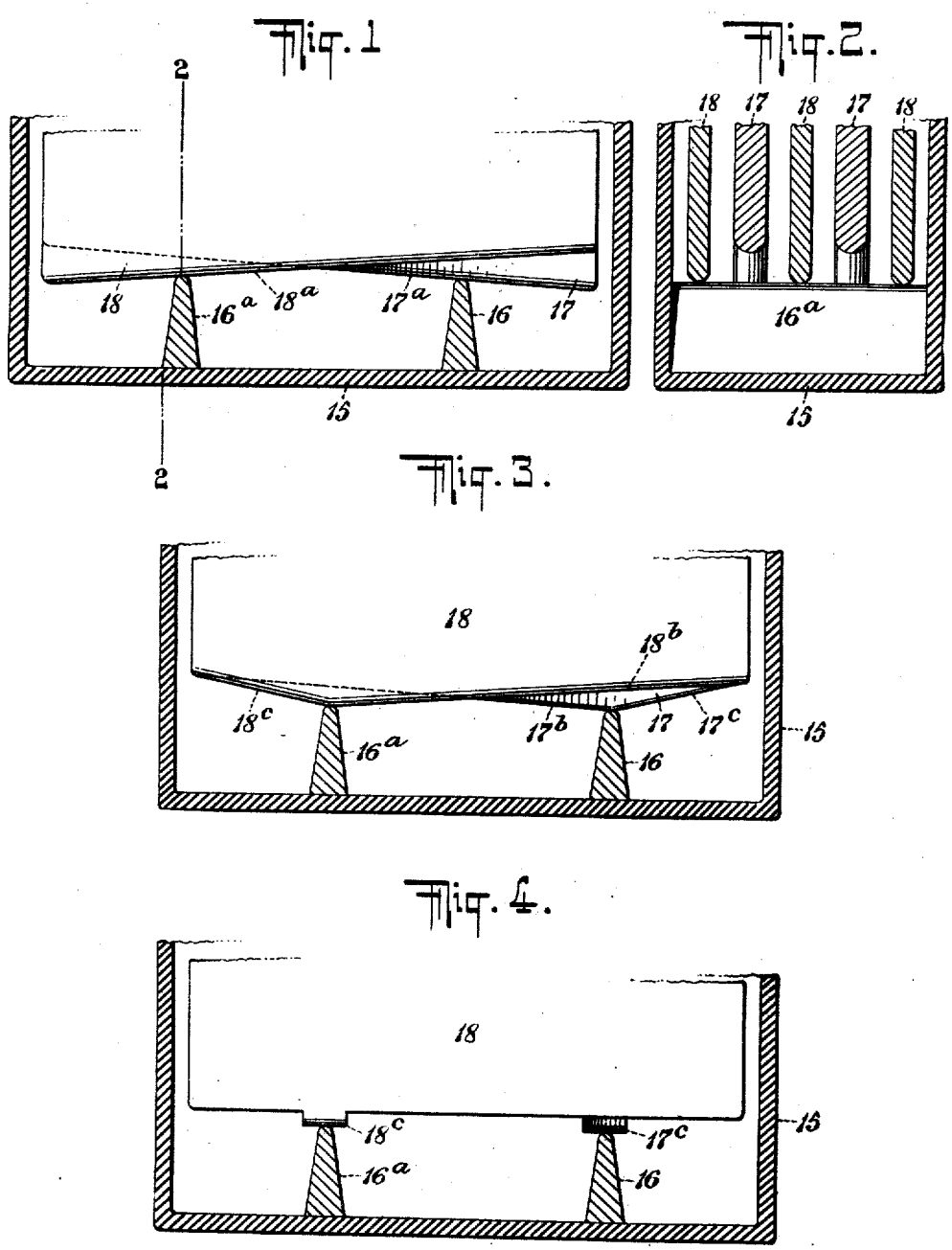

UNITED STATES PATENT OFFICE.

MATTHEW LECHNER, OF NEW YORK, N. Y.

ELECTRIC STORAGE BATTERY.

1,359,259.

Specification of Letters Patent.　　Patented Nov. 16, 1920.

Application filed July 29, 1918.  Serial No. 247,111.

*To all whom it may concern:*

Be it known that I, MATTHEW LECHNER, a citizen of the United States, and resident of the borough of Manhattan, city, county, and State of New York, have invented certain new and useful Improvements in Electric Storage Batteries, of which the following is a specification.

My invention relates to electric storage batteries, and more particularly to that type thereof in which lead plates form elements of the construction. In the operation of such batteries, a certain amount of material is cast off from the plates and passes down to the bottom of the cells where it forms gradually increasing heaps of sediment which form connections between two plates of different polarity. The sediment comprises lead, lead peroxid and sulfate of either, and it is true, is not a good conductor of electricity; it is, however, a sufficiently good conductor to establish an electrical circuit between adjacent positive and negative plates. Numerous small currents result, the sum total of which represents a continuous and injurious loss of electrical energy at all stages and during the entire life of the battery.

The particular object of my invention is to provide a construction in which these objectionable circuits between positive and negative plates, due to the accumulating sediment, are prevented and the consequent loss of electrical energy avoided.

Other more specific objects will appear from the description hereinafter, and the features of novelty will be pointed out in the appended claims.

In the accompanying drawings which, for illustrative and descriptive purposes, show a number of examples of my invention, Figure 1 is a longitudinal section of a portion of a battery cell showing one form of my invention; Fig. 2 is a cross-section thereof on the line 2—2 of Fig. 1; Figs. 3, 4 and 5 are views similar to Fig. 1 showing additional forms of my invention; Figs. 6, 7 and 8 are perspective views of still other forms of my invention; Fig. 9 is a plan view illustrating the form shown in Fig. 8; Fig. 10 is a sectional view showing a still further form of my invention and Fig. 11 is a cross-section thereof on the line 11—11 of Fig. 10.

As shown in the drawings, the battery cell comprises the customary jar 15 of hard rubber or other suitable material, having a plurality of interiorly located ribs or bridges, for instance two, 16 and 16ª, projecting upwardly from its bottom. The cell includes further the usual positive plates 17 and negative plates 18 supported in any well known way and spaced apart by separators 19 and 20 usually consisting of rubber and wood respectively. The separators 19 and 20 are located in surface engagement with each other between two plates, with the rubber separator 19 in surface contact with the positive plate 17 and the wood separator 20 in surface engagement with the negative plate 18. The separators 19 and 20, when combined in pairs, are of such combined dimensions as to fit snugly between a pair of plates 17 and 18, and to frictionally engage the opposed surfaces thereof in the usual way; all of the plates in a single cell, together with their supports, are thus secured together in the form of a unit in which the individual plates are incapable of relative movement in any direction.

In the operative condition of the battery, the units comprising the positive plates 17 and negative plates 18 with their supports, and the separators 19 and 20, all in fixed relation to each other are located within the jar 15 and rest upon the ribs or bridges 16 and 16ª in transverse relation thereto. It is a well recognized fact that the sediment which falls from the plates in the operation of the battery, accumulates at the bottom of the jar, in heaps along the side surfaces of the ribs or bridges 16 and 16ª, the accumulation being greatest at these points and becoming gradually less toward the center of the spaces between plates. If, as in existing constructions, the lower edges of each plate 17 and 18 rest upon both bridges 16 and 16ª, short-circuiting of the plates will occur as soon as the sediment therefrom reaches an amount sufficient to contact with a positive and a negative plate and thus establish an electrical connection therebetween. This occurs at a relatively early stage in the use of the cell, since the falling sediment forms a skin on the bridges and the bottom of the jar, which skin is capable of electrically connecting the plates.

This objection is avoided in the form shown in Figs. 1 and 2 by making the lower edge 17$^a$ and 18$^a$ of the positive and negative plates 17 and 18 respectively, inclined instead of at right angles to the vertical edges of said plates. In assembling the plates they are set in reversed relation to each other so that the edge 17$^a$ inclines upwardly in one direction while the edge 18$^a$ inclines upwardly in the opposite direction; in other words, looking at the assembled plates as in Fig. 1 the edges 17$^a$ and 18$^a$ intersect each other. With the described arrangement the edge 17$^a$ will rest upon the bridge 16 and be free or spaced from the bridge 16$^a$ while the edge 18$^a$ will rest upon the bridge 16$^a$ and be free or spaced from the bridge 16; owing to the fact that the plates are combined in the form of a rigid unit with the separators 19 and 20 an efficient and adequate support of the battery elements is secured even though the plates alternately engage only individual bridges.

It will be obvious that the sediment which always accumulates to the greatest extent along and upon the surfaces of the bridges 16 and 16$^a$ cannot form a connection between a positive plate and an adjacent negative plate for the reason that one of said plates is spaced from a given bridge. The top edges of the bridges 16 and 16$^a$ are generally rounded or otherwise formed to prevent an accumulation of sediment thereon; the vibration resulting from a moving vehicle will also prevent the gathering of sediment in any material quantities upon the upper edges of the bridges.

In the form shown in Fig. 3 the lower edges of the plates 17 and 18 instead of extending from one side edge to the other in a continuous incline are formed with compound inclines 17$^b$ and 17$^c$ and 18$^b$ and 18$^c$; the inclines 17$^c$ and 18$^c$ are shorter than the inclines 17$^b$ and 18$^b$ with the proportions so arranged that the junction points of the respective inclines represent the points at which the plates engage the bridges and upon which they are supported. The plates 17 and 18 in this form also, are set in reversed relation to each other so far as the inclined lower edges are concerned, so that the positive plates will be in engagement with and supported upon, for instance, the bridge 16 and spaced from the bridge 16$^a$ while the negative plates will be in engagement with and supported upon the bridge 16$^a$ but spaced from the bridge 16 or vice versa.

As illustrated in Fig. 4, the plates 17 and 18 are symmetrical and the lower edges thereof are provided with lugs or projections 17$^c$ and 18$^c$ respectively located, when the plates are in reversed relation to each other, so as to register with the bridges 16 and 16$^a$. Thus the lugs 17$^c$ of the positive plates 17 will engage the bridge 16 and the lugs 18$^c$ of the negative plates 18 will engage the bridge 16$^a$, the plates being each spaced from the other bridge.

In Fig. 5 the plates are also symmetrical and at the lower edges are provided with notches 17$^d$ and 18$^d$ respectively arranged to register with the bridges 16 and 16$^a$; by assembling the plates 17 and 18 in alternate reversed relation to each other the notches 17$^d$ will be in registry with one bridge, for instance, 16$^a$, while the notches 18$^d$ are in registry with the other bridge 16. With this arrangement also each plate, positive and negative, rests upon one bridge only and is out of engagement with the other; the points of engagement of the positive and negative plates are never with the same bridge and are never contiguous to each other.

Figs. 6, 7 and 8 illustrate my improvement applied to the bridges 16 and 16$^a$ which as shown are provided with seats 16$^b$ and recesses 16$^c$ alternating with each other in each bridge; the arrangement is such that the seats 16$^b$ and recesses 16$^c$ of one bridge will be staggered with respect to the seats and recesses of the other bridge or, in other words, the seats 16$^b$ of the bridge 16 will register with the recesses of the bridge 16$^a$ and vice versa. The plates 17 and 18 in this case are symmetrical and of true rectangular form as in existing batteries; when in position in the cell the positive plates 17 will rest, for instance, upon the seats 16$^b$ of the bridge 16$^a$ and project over the recesses 16$^c$ of the bridge 16 while the negative plates 18 will rest upon the seats 16$^b$ of the bridge 16 and extend over the recesses 16$^c$ of the bridge 16$^a$ as shown in Fig. 9, in which the separators 19 and 20 are shown as partly broken away. It will be seen in this form that the plates are in contact with one bridge and out of contact with the others.

The form shown in Fig. 10 includes a central bridge 16$^d$ and two outside bridges 16; the bridges 16 may be recessed as in Figs. 6, 7 and 8 or constructed as in the other forms. In this instance one set of plates, for instance, the positive plates 17, rests upon the seats 16$^b$ of the bridges 16 and are provided with recesses 17$^e$ in registry with the central bridge 16$^d$ and of sufficient dimensions to escape contact therewith; the plates 17 thus straddle the central bridge but do not engage the same. The negative plates 18 rest upon the central bridge 16$^d$ but extend over the recesses 16$^c$ of the outer bridges 16 and thus do not engage said outer bridges 16 as shown in Fig. 11. This form includes the same advantages as the other forms; even if the sediment should accumulate in sufficient quantities along the bridges 16 to form a connection between two negative plates 18 or along the central bridge 16$^d$ to form a connection between two positive plates this will have no injurious results as in each case the connected plates are of the same polarity.

In all of the forms described the close frictional engagement between the plates, separators and other elements prevent either one of the groups of connected plates of the same polarity from tilting on the single points of support as fulcrums into contact with the second bridge; the unit constituting the plates, separators, etc., is thus rigidly supported in proper position to maintain the plates out of contact with a given bridge as desired. If through use or from other causes the group of plates of a given polarity should become loosened and thus be capable of independent movement relatively to the other group, any suitable means may be used to counteract or correct this condition; for instance, a suitable member of insulating material constructed in the form of a spacing device may be fitted between the plates near their upper portions for this purpose.

My improvements in all forms are extremely simple and efficient and may readily be combined in and with batteries of existing constructions. My improvements reduce the period of charging the batteries and avoid the necessity for forcing a surplus amount of electrical energy beyond what would ordinarily be required into the cell sufficient to keep the elements clean; in other words in existing constructions it is necessary to overcharge the battery to an extent corresponding with the amount of energy lost through the accumulating sediment. Naturally the energy at the disposal of the user, after the battery has been charged, is decreased to a like extent for the same reasons. My improvements also do away with practically all of the so-called self-discharge, obviate undue sulfating of the plates and the consequent necessity for overcharging to again clean the same, reduce the exposure of the plates to gasing to a minimum and increase the life of the batteries to a maximum extent by reducing the loosening and dropping of active material to very small amounts.

Various changes in the specific forms shown and described may be made within the scope of the claims without departing from the spirit of my invention.

I claim:—

1. In a storage battery cell, the combination of a container, positive and negative plates therein, means whereby said plates are combined in the form of a unit, and spaced bridges in said container whereby said unit is maintained in position, the supporting edges of said plates having portions extending downwardly beyond contiguous portions of said plates, the latter being set in reversed relation to each other in said cell whereby said plates are in engagement with one bridge and spaced from the other bridge.

2. In a storage battery cell, the combination of a container, plates therein, and spaced bridges beneath said plates for maintaining them in position, the arrangement including recesses located entirely within the confines of the element on which they are located whereby said plates are in engagement with one bridge and out of engagement with the other.

3. In a storage battery cell, the combination of a container, positive and negative plates therein, means whereby said plates are combined in the form of a unit, and spaced bridges in said container whereby said unit is maintained in position, the positive plate having a recess in registry with one bridge and the negative plate having a recess in registry with the other bridge whereby said plates have contact with one bridge but not with the other, said recesses being located entirely within the peripheries of said plates.

4. In a storage battery cell, the combination of a container, a group comprising positive and negative plates therein combined in the form of a unit, and a second group comprising spaced bridges in said container whereby said unit is maintained in position, one of said groups having seats and recesses, the seats and recesses of opposed members of said group being staggered with respect to each other whereby said plates have contact with one bridge but not with the other.

MATTHEW LECHNER.